(12) United States Patent
Katsuta et al.

(10) Patent No.: US 7,218,990 B2
(45) Date of Patent: May 15, 2007

(54) CONTROL DEVICE FOR USE IN INJECTION MOLDING MACHINE

(75) Inventors: Hiroshi Katsuta, Gotemba (JP);
Hirotaka Sekino, Numazu (JP); Ryoji Tominaga, Hoffman Estates, IL (US);
Kunihiko Noda, Numazu (JP);
Yasumasa Sugiyama, Numazu (JP);
Takato Baba, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/402,266

(22) Filed: Apr. 12, 2006

(65) Prior Publication Data
US 2006/0253221 A1  Nov. 9, 2006

(30) Foreign Application Priority Data
Apr. 14, 2005 (JP) ............................. 2005-117149
Apr. 26, 2005 (JP) ............................. 2005-128326

(51) Int. Cl.
*G06F 19/00* (2006.01)
(52) U.S. Cl. .................... 700/202; 700/83; 345/741
(58) Field of Classification Search ............... 700/202, 700/200, 204, 83, 95; 425/143; 345/741–743
See application file for complete search history.

(56) References Cited

U.S. PATENT DOCUMENTS 5,525,050 A * 6/1996 Takizawa et al. ........... 425/143
6,931,300 B2 * 8/2005 Yamazaki et al. .......... 700/200

FOREIGN PATENT DOCUMENTS

JP         2001-191383         7/2001

* cited by examiner

*Primary Examiner*—Kidest Bahta
(74) *Attorney, Agent, or Firm*—DLA Piper US LLP

(57) ABSTRACT

A barrel has an injection nozzle at the forward end, and an injection screw inside, and heaters in the outer circumference. The barrel injects the molten resin from the injection nozzle at the forward end by the rotation of the injection screw. In the barrel, the temperatures of each parts are controlled by a temperature control section. A controller sets a shift minus temperature to uniformly lower the temperature of the parts, and a shift absolute temperature to lower the temperatures of the parts to a predetermined temperature. An operation panel section selects the shift minus temperature or shift absolute temperature to lower the temperatures of the parts. The temperature control section lowers the temperatures of the parts of the barrel by using the temperature selected when the injection molding machine is temporarily stopped.

4 Claims, 7 Drawing Sheets

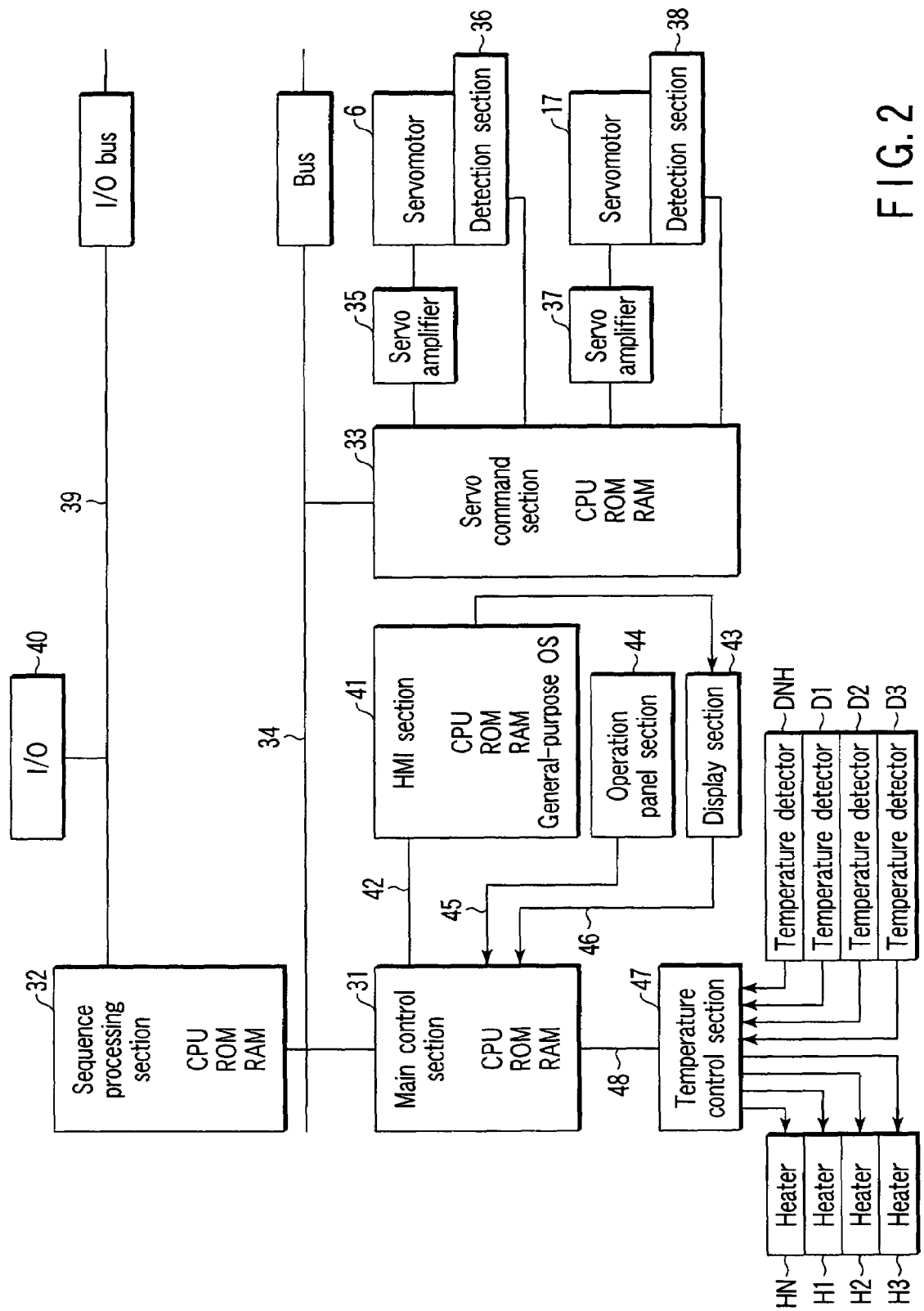
F I G. 2

CONTROL DEVICE FOR USE IN INJECTION MOLDING MACHINE

CROSS-REFERENCE TO RELATED APPLICATIONS

This application is based upon and claims the benefit of priority from prior Japanese Patent Applications No. 2005-117149, filed Apr. 14, 2005; and No. 2005-128326, filed Apr. 26, 2005, the entire contents of both of which are incorporated herein by reference.

BACKGROUND OF THE INVENTION

1. Field of the Invention

The present invention relates to a control device for use in an injection molding machine, which molds molten resin by injecting from a distal end of a barrel. Synthetic resin material is heated and melted in the barrel.

2. Description of the Related Art

An injection molding machine has a cylindrical barrel and a hopper for inputting synthetic resin material.

The barrel has an injection nozzle at its forward end. The barrel contains an injection screw rotatable and movable forward and backward, and has heaters on its outer circumference.

The hopper is placed at the rear of the barrel, and feeds the input synthetic resin material into the barrel.

The barrel melts synthetic resin material by heating the material. The barrel pushes the heated molten resin toward the forward end by the rotation of the injection screw, and injects the resin from the injection nozzle to the mold.

The mold is kept closed by a mold open/close mechanism, and the molten resin injected from the injection nozzle fills the mold cavity.

Then, the injection nozzle is separated from the mold, and the mold is released from the mold open/close mechanism. A molded product is taken out from the mold.

A control device for the injection molding machine controls the temperature of the barrel which heats, melts and injects synthetic resin material.

Namely, the control device controls the temperatures of the rear part, middle part, front part and nozzle of the barrel to a predetermined temperature.

The control device sets the temperature of the rear part to the lowest temperature, sets the temperature of the middle part to about 10° C. higher than the temperature of the rear part, sets the temperature of the front part to about 20° C. higher than that of the rear part, and sets the temperature of the nozzle to about 10° C. higher than that of the rear part.

The control device also controls the temperature of the barrel when temporarily stopping the injection molding machine.

Namely, when the injection molding machine is temporarily stopped, the control device sets a shift minus temperature to uniformly lower the temperatures of the rear part, middle part, front part and nozzle of the barrel. The control device uniformly lowers the control temperatures of these parts by using the shift minus temperature.

For example, if the temperature of the rear part at molding is 300° C., the control device sets the temperature of the middle part to 310° C., sets the temperature of the front part to 320° C., and sets the temperature of the nozzle to 310° C.

When the injection molding machine is temporarily stopped, and if, for example, the shift minus temperature is set to −100° C., the control device lowers the temperature of the rear part to 200° C., lowers the temperature of the middle part to 210° C., lowers the temperature of the front part to 220° C., and lowers the temperature of the nozzle to 210° C.

When the operation is temporarily stopped in an injection molding machine, the flow of molten resin in the barrel is stopped. Thus, even if the control temperature of each part is lowered by using a shift minus temperature, a scorching caused by deteriorated resin occurs in some types of resins. Particularly, a scorching may frequently occur in the front part of the barrel where the control temperature is higher.

Therefore, the shift minus temperature can be set on the basis of the control temperature of the front part lowered to a value not to cause, scorching.

However, if the temperature of the front part is lowered, the temperatures of the rear part, middle part and nozzle of the barrel are unnecessarily lowered. As a result, a longer period of time is required to increase the temperatures of these parts of the barrel to a temperature value sufficient for molding when the injection molding machine is restarted. Furthermore, the molten resin in the barrel may deteriorate if the temperature is unnecessarily lowered.

BRIEF SUMMARY OF THE INVENTION

A control device of an injection molding machine, according to an embodiment of the present invention, permits to select control of temperature to lower the temperature of each part of a barrel uniformly by a shift minus temperature, and to select control of temperature to lower the temperature of each part of a barrel to a predetermined temperature called an absolute temperature.

By selecting a type of temperature control, the present invention permits setting the temperature of each part of a barrel that is suitable for the resin used, when the injection molding machine is temporarily stopped.

In one aspect of the present invention, there is provided an injection molding machine having a barrel which has an injection nozzle at the forward end. The barrel contains an injection screw rotatable and movable forward and backward, and has heaters on its outer circumference. Synthetic resin material is input through the rear part of the barrel. The barrel heats and melts the synthetic resin using the heaters. The barrel pushes the molten resin toward the forward end by the rotation of the injection screw, and injects the resin from the injection nozzle to a mold.

The injection molding machine has a temperature control device which sets the temperatures of parts of the barrel to a predetermined value by controlling the heaters. The injection molding machine includes a shift minus temperature set memory which sets a shift minus temperature to uniformly lower the control temperatures of the parts, and a shift absolute temperature set memory which sets a shift absolute temperature to lower the control temperatures of the parts to a predetermined temperature. The injection molding machine further includes a selection means which selects the temperatures set in the temperature set memories to lower the temperatures of the different parts controlled by the temperature control device. The temperature control device controls the temperature of each part by using the set temperature of the temperature set memory selected by the selection means.

Additional features and aspects of the invention will be set forth in the description which follows. Other aspects will be apparent from the description, or may be learned by practice of the invention. Aspects of embodiments of the invention may be realized and obtained by means of instrumentation and combinations particularly pointed out hereinafter.

BRIEF DESCRIPTION OF THE SEVERAL VIEWS OF THE DRAWING

The accompanying drawings, which are incorporated herein and constitute a part of the specification, illustrate various embodiments of the invention, and together with the general description given above and the detailed description of the embodiments given below, serve to explain the principles of the invention.

FIG. 2 is a block diagram showing the configuration of a control device of a main body of the injection molding machine shown in FIG. 1;

DETAILED DESCRIPTION OF THE INVENTION

An embodiment of the present invention will be explained hereinafter with reference to the accompanying drawings.

In the embodiment, a control device is used in an electric injection molding machine.

Figure 1:
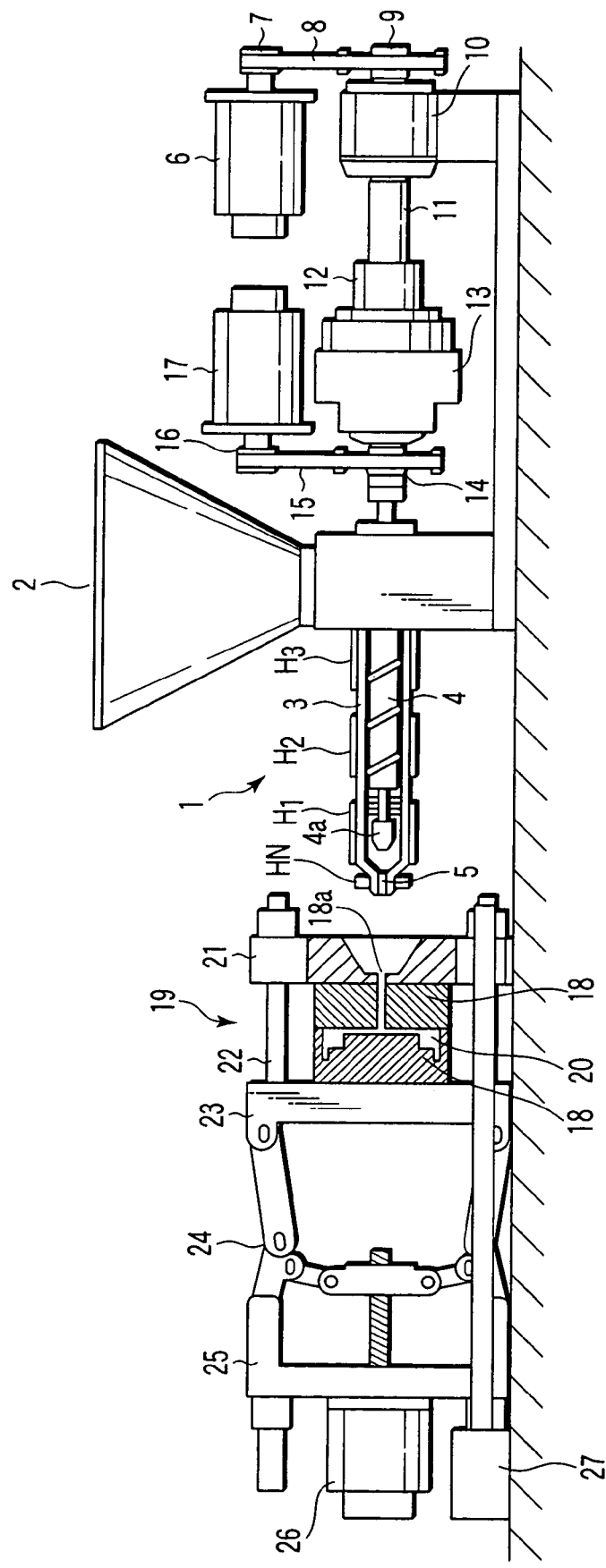
FIG. 1 is a view showing the configuration of an electric injection molding machine, according to an embodiment of the present invention.

As shown in FIG. 1, in an injection molding machine main body 1, an injection screw 4 is provided. The injection screw 4 is provided in a cylindrical barrel 3. The injection molding machine is provided with a hopper 2.

The injection screw 4 is rotatable in the barrel 3 and movable forward and backward.

A rear part of the barrel 3 is communicatively connected to the hopper 2. The hopper 2 inputs synthetic resin material into the barrel 3.

The barrel 3 is provided with an injection nozzle 5 for injecting molten synthetic resin through the forward end of the barrel.

The barrel 3 has heaters HN, H1, H2 and H3 disposed in the outer circumferences of the nozzle, front part, middle part and rear part of the barrel, respectively.

The heaters HN and H1–H3 heat the outer circumference of the barrel 3, and melt the synthetic resin material input from the hopper 2.

When the barrel 3 is heated, the temperature of the rear part is set to a lowest temperature, the temperature of the middle part is set to 10° C. higher than the temperature of the rear part, the temperature of the front part is set to 20° C. higher than the temperature of the rear part, and the temperature of the nozzle is set to 10° C. higher than the temperature of the rear part.

By this temperature control, the melting degree of the molten resin in the barrel 3 is gradually increased from the rear to the front part.

The injection nozzle 5 injects the sufficiently molten resin.

The injection screw 4 is driven forward and backward by a servomotor 6 to perform injection.

Namely, a rotation of the injection servomotor 6 is transmitted to a ball screw shaft 11 through a transmission mechanism consisting of a pulley 7, a timing belt 8 and a timing pulley 9.

The ball screw shaft 11 is fit rotatably to a servo bracket 10.

The ball screw shaft 11 is set in a ball nut 12.

The ball nut 12 is rotatably connected to a thrust box 13.

The rear end of the injection screw 4 is rotatably connected to the thrust box 13 through a S-shaft (not shown) and bearing (not shown).

The S-shaft is rotatably connected to the thrust box 13. The S-shaft is provided with a timing pulley 14.

A reference numeral 17 denotes a measuring servomotor, which fixes a pulley 16 to the rotating shaft.

A timing belt 15 is laid over the timing pulley 14 and pulley 16.

The timing pulley 14, timing belt 15 and pulley 16 constitute a transmission mechanism.

The measuring servomotor 17 moves the injection screw 4, material which is to be injected forward, determining an amount of the melted resin.

The measuring servomotor 17 rotates the injection screw 4 by transmitting the rotation to the S-shaft through the transmission mechanism.

The advancing position of the injection screw 4 is determined by the amount of injecting synthetic resin.

At the forward position of the barrel 3, there are metal mold halves 18 and a device 19 for opening/closing and clamping the metal mold halves 18.

When molten resin is injected from the injection nozzle 5, the injection nozzle 5 is pressed to a nozzle inlet 18a of one metal mold half 18.

In this state, the injection screw 4 moves the forward end 4a forward, and the injection nozzle 5 injects the molten resin generated in the barrel 3. The injected molten resin is filled in a cavity 20 defined by the metal mold halves 18.

The device 19 has a fixing plate 21 that supports one of the metal mold halves 18. A movable plate 23 is provided. The movable plate 23 holds a tie bar 22 that in turn supports the fixing plate 21. The movable plate 23 can move toward and away from the fixing plate 21.

The device 19 fixes the movable board 23 to a toggle mechanism support board 25 through a toggle type mold clamping mechanism 24.

The toggle mechanism support board 25 is provided with a clamping servomotor 26 for driving the clamping mechanism 24.

A reference numeral 27 denotes a mold thickness adjusting mechanism. The mold thickness adjusting mechanism 27 adjusts the mold thickness when the mold clamping mechanism 24 clamps a mold.

In an electric injection molding machine with the above configuration, the clamping servomotor 26 is driven first.

Then, the metal mold halves 18 start closing.

The injection nozzle 5 of the barrel 3 is pressed against the nozzle inlet 18a of the one metal mold half 18.

Then, the measuring servomotor 17 rotates and advances the injection screw 4, determining an amount of the melted resin to be injected.

Then, the injection servomotor 6 rotates the injection screw 4 for injecting molten resin.

The barrel 3 injects molten resin through the injection nozzle 5, and fills the molten resin in the cavity 20 of the metal mold halves 18.

As shown in FIG. 2, a control device of the injection molding machine main body 1 has a main control section 31 to control each part of the injection molding machine. The control device has a sequence processing section 32, and a servo command section 33.

The main control section 31 has a CPU, a ROM and a RAM. The main control section 31 monitors and controls the injection molding machine main body 1.

The sequence processing section 32 has a CPU, a ROM and a RAM, and controls the operation sequence of the injection molding machine main body 1.

The servo command section 33 has a CPU, a ROM and a RAM, and controls the injection servomotor 6 and measuring servomotor 17.

The main control section 31, sequence processing section 32 and servo command section 33 are electrically connected through a bus line 34.

The servo command section 33 controls a servo amplifier 35, and drives the injection servomotor 6. The rotation and current value of the injection servomotor 6 are detected by a detection section 36.

The servo command section 33 takes in a signal from the detection section 36, and detects the moving position and rotation speed of the injection screw 4, and the current value of the motor.

The servo command section 33 performs feedback control based on the detected moving position, rotation speed and motor current value, and controls the injection servomotor 6.

The servo command section 33 controls a servo amplifier 37, and drives the measuring servomotor 17. The detection section 38 detects the rotation and current value of the measuring servomotor 17.

The servo command section 33 takes in a signal from the detection section 38, and detects the moving position and rotation speed of the injection screw 4, and the current value of the motor.

The servo command section 33 performs feedback control based on the detected moving position, rotation speed and motor current value, and controls the injection servomotor 17.

An I/O 40 is electrically connected to the sequence processing section 32 through an I/O bus 39.

The main control section 31 has a communication interface, and connects the communication interface with a HMI (Human Machine Interface) section 41 through LAN 42, such as Ethernet (registered trademark).

The HMI section 41 has a CPU, a ROM, a RAM and a general-purpose OS (Operating System).

The HMI section 41 consists of a personal computer, for example. The HMI section 41 is connected to a display section 43 having a touch panel provided on a liquid crystal display, and controls the display.

The main control section 31 is connected to an operation panel section 44 provided with mechanical operation switches, through a cable 45.

The main control section 31 is connected to the touch panel of the display section 43 having a touch panel, through a cable 46.

The main control section 31 is connected to a temperature control section 47 through a cable 48. The temperature control section 47 controls the temperatures obtained on parts of the barrel by the heaters HN and H1–H3 provided on the outer circumference of the barrel 3.

The barrel 3 has temperature detectors DHN, D1, D2 and D3 to detect the temperatures of the nozzle, front part, middle part and rear part of the barrel, respectively.

The temperature controller 47 takes in temperature detection signals from the temperature detectors DHN, D1, D2 and D3, and controls power supply to the heaters HN and H1–H3.

Figure 3:
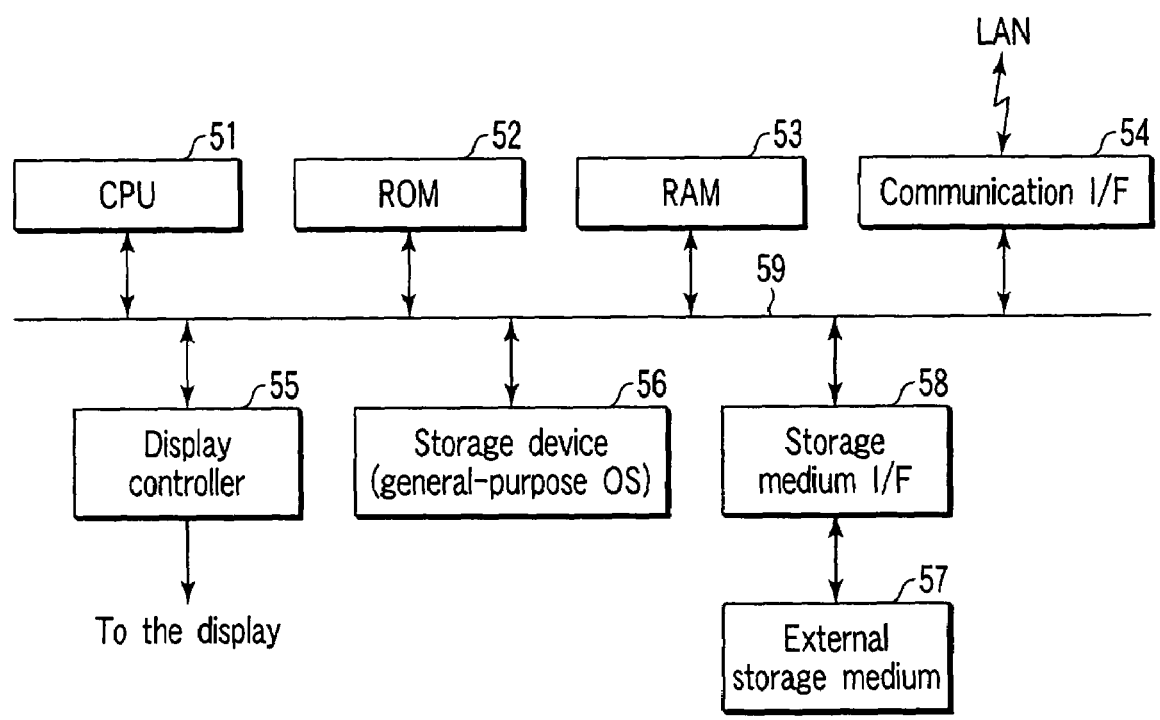
FIG. 3 is a block diagram showing the configuration of a Human Machine Interface (HMI) section of the control device shown in FIG. 2.

As shown in FIG. 3, the HMI section 41 has a CPU 51 composing the controller main body, a ROM 52 storing program data, a RAM 53 provided with a memory used for data processing, and a communication interface (I/F) 54 to communicate with the main control section 31 through the LAN 42.

The HMI section 41 is connected to a display controller 55 to control the display 43 with a touch panel. The HMI section 41 is also connected to a storage device 56 which uses a nonvolatile storage medium such as a compact flash memory (registered trademark) card storing a general-purpose OS and a hard disc. The HMI section 41 is also connected to external storage medium 57 such as an optical disc. The HMI section 41 has a storage medium interface (I/F) 58 to make data communication with the external storage medium 57.

The CPU 51, ROM 52, RAM 53, communication interface 54, display controller, storage device 56, and storage medium interface 58 are electrically connected through a bus line 59.

The HMI section 41 controls the display section 43 with a touch panel through the display controller 55.

The main control section 31 inputs key signals entered from the touch panel of the display section 43 with a touch panel, and sends the signal required by the HMI section 41 out of the input key signals, to the HMI section 41 through the LAN 42.

Figure 4:
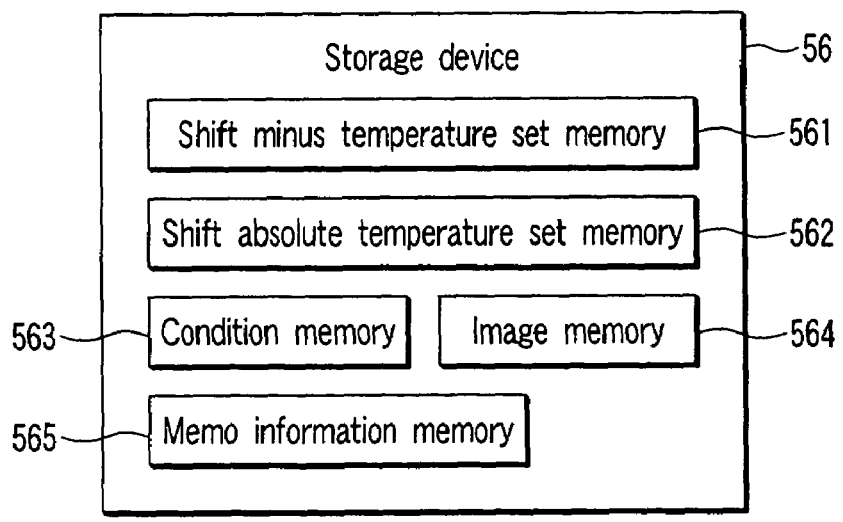
FIG. 4 is a view showing the configuration of an essential memory provided in a memory unit of the HMI section of the control device, according to an embodiment of the present invention.

As shown in FIG. 4, the storage device 56 has a shift minus temperature set memory 561 to set a shift minus temperature in a storage medium, and a shift absolute temperature set memory 562 to set a shift absolute temperature.

The storage device 56 has a condition storage 563 to store shaping conditions set for moldings and identification information consisting of a file name, for example. The storage device 56 has also an image storage 564 to store image data for moldings with identification information, and a memo storage 565 to store memo such as notes on shaping under various conditions, with identification information.

The shift minus temperature set memory 561, shift absolute temperature set memory 562, condition storage 563, image storage 564 and memo storage 565 are provided in the storage device 56 in this embodiment. However, a part or all of the storages may be provided in the external storage-medium 57.

The shift minus temperature is a temperature set to lower the temperatures of the nozzle, front part, middle part and rear part of the barrel 3 uniformly by, for example, 100° C., when the operation of the injection molding machine is temporarily stopped.

The shift absolute temperature is a temperature set to lower the temperatures of the nozzle, front part, middle part and rear part of the barrel 3 to a predetermined temperature, when the operation of the injection molding machine is temporarily stopped.

In an injection molding machine with the above configuration, the operator first sets the conditions of shift operation and molding, and confirm precautions to be taken before molding a product.

Figure 5:
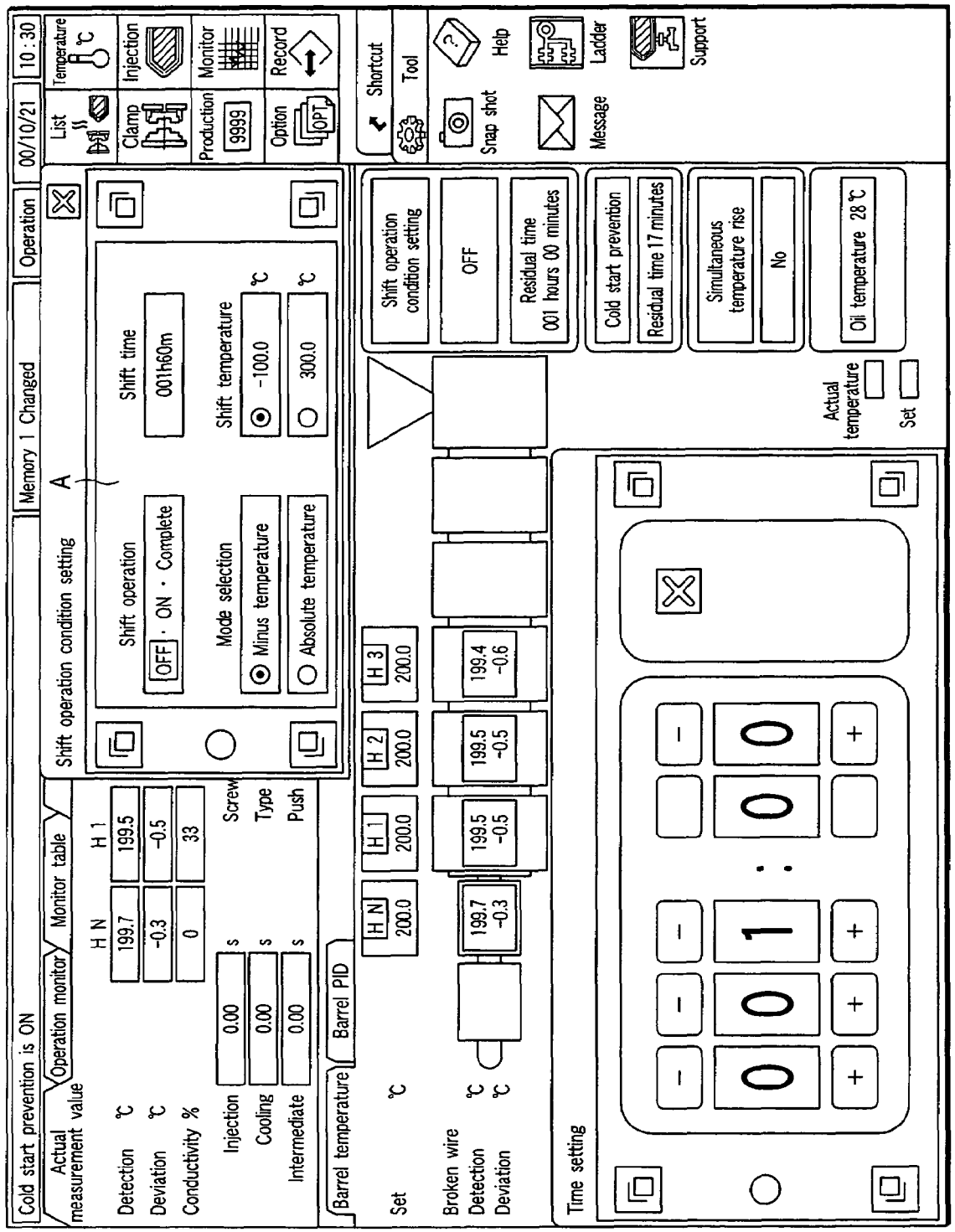
FIG. 5 is a view showing a display screen for setting shift operation conditions in a display section with a touch panel, according to an embodiment of the present invention.

When setting the conditions of shift operation, the display section 43 having a touch panel displays a screen shown in FIG. 5.

Namely, the display section 43 displays a window indicated by A in the drawing. The window is used to select a shift minus temperature or a shut absolute temperature as a method of lowering the temperatures of the nozzle, front part, middle part and rear part of the barrel, when the injection molding machine is temporarily stopped.

The window A is a screen for setting the conditions of shift operation.

When "Minus temperature" is selected in Select Mode, the CPU 51 of the HMI section 41 reads a shift minus temperature from the shift minus temperature set memory 561.

When "Absolute temperature" is selected in Select Mode, the CPU 51 of the HMI section 41 reads a shift absolute temperature from the shift absolute temperature set memory 562.

The HMI section 41 sends the read shift minus temperature or shift absolute temperature, to the main control section 31.

The main control section 31 temporarily stores in the RAM the data representing the shift minus temperature or shift absolute temperature.

Figure 6:
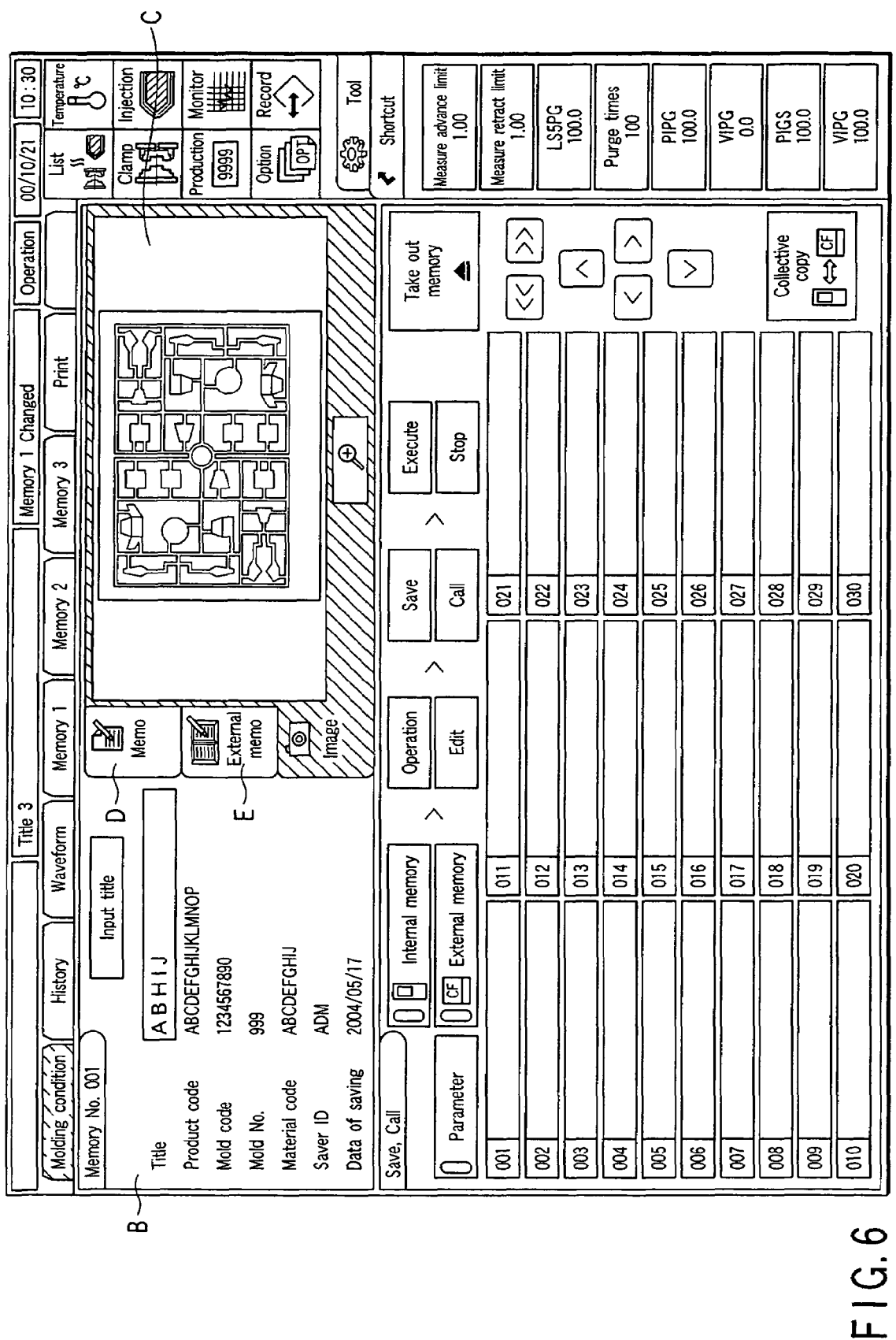
FIG. 6 is a view showing a display screen for setting molding conditions in a display section with a touch panel, according to an embodiment of the invention.

When setting molding conditions, the display section 43 having a touch panel displays a molding condition set screen shown in FIG. 6.

In this screen, an input title, a product code corresponding to the title, mold code and mold number are displayed in a window indicated by B.

For example, when a file name of a corresponding product is entered as a title in the screen of FIG. 6 in a state that an image display is given priority, the display section 43 displays an image of a molding in a part of the screen as indicated by C.

With this image display, the operator can easily confirm a product by viewing the image, even if the operator does not know a product.

When the operator knows a product, the operator, can easily confirm that the input title is correct, by viewing the image.

Figure 7:
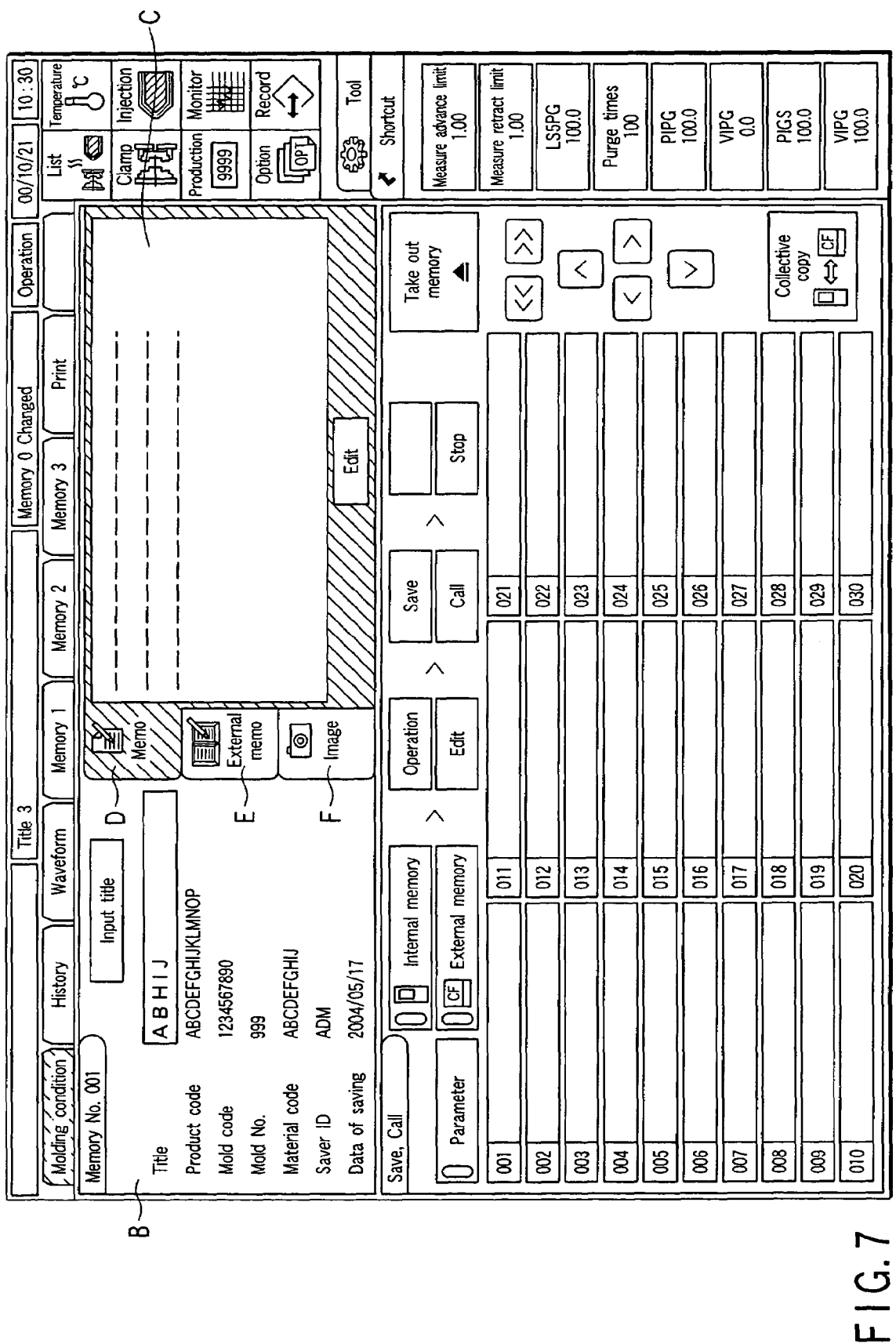
FIG. 7 is a view showing another display screen for setting molding conditions in a display section with a touch panel according to another embodiment of the present invention.

When the touch panel "Memo" indicated by the icon D in the screen of FIG. 6 is touched with a finger, textual information such as precautions to be taken on molding is displayed in the area of the display section 43 indicated by C, instead of the image of product, as shown in FIG. 7.

With this display, the operator can easily confirm the information used for molding.

Figure 8:
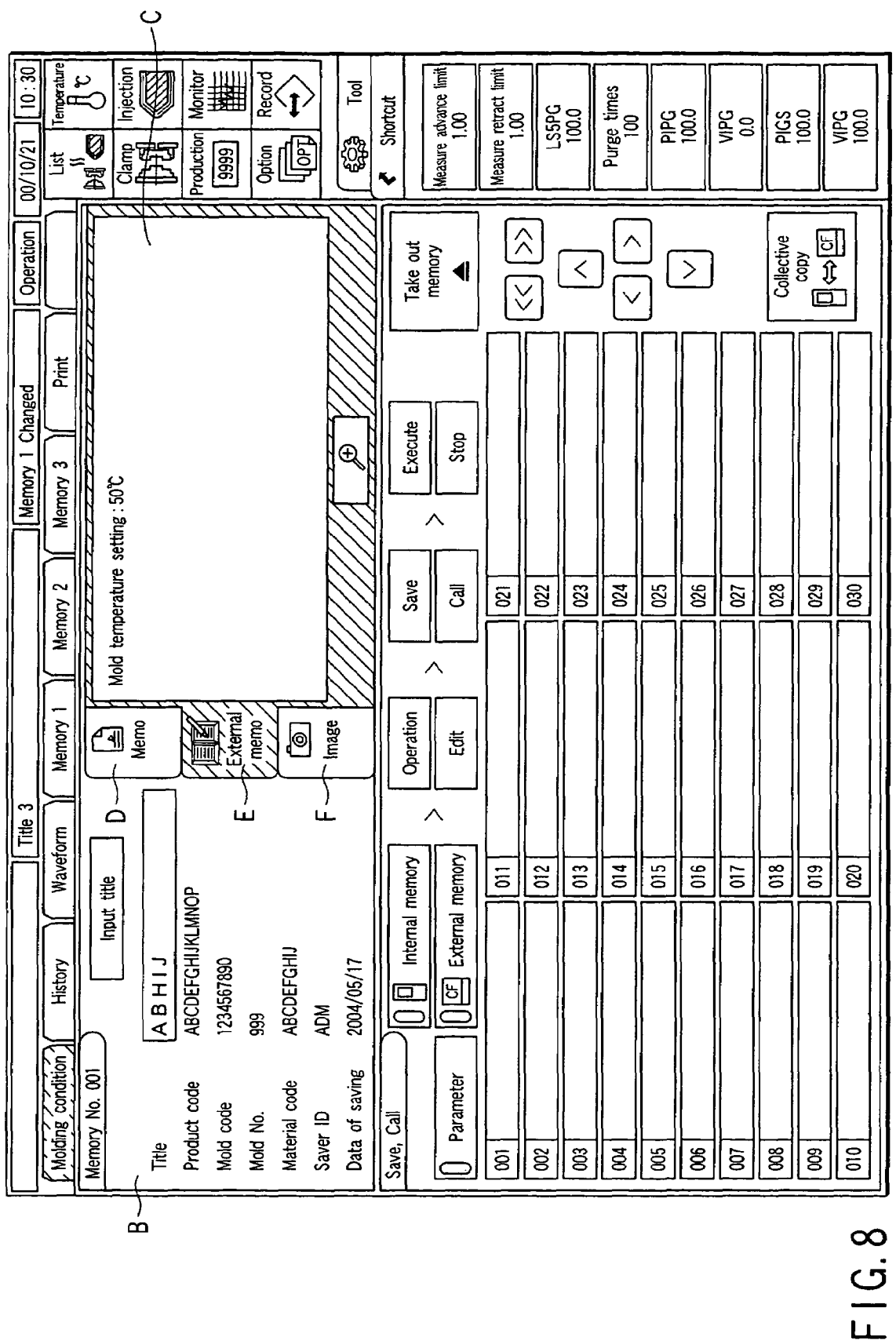
FIG. 8 is a view showing another display screen for setting molding conditions in a display section with a touch panel according to another embodiment of the present invention.

When the touch panel "External memo" indicated by the icon E in the screen of FIG. 6 is touched with a finger, an externally set item is displayed as an external memo in the area of the display section 43 indicated by C, instead of the image of product, as shown in FIG. 8.

With this display, the operator can easily confirm the necessary information other than those previously set in the internal memory.

When the touch panel "Image" indicated by the icon F in the screen of FIG. 7 or FIG. 8 with a finger, the screen of the display section 43 is returned to the screen of FIG. 6.

In this way, the operator displays the screen for setting the molding conditions by touching the touch panel of the display section 43, before starting the molding.

In this state, the operator inputs a file name of a corresponding product as a title. The display section 43 displays the image of product with the corresponding molding conditions on the screen.

When the operator touches the "Memo" icon D or "External memo" icon E, the display section 43 displays the information used for molding or externally set item such as precautions.

Therefore, the operator can smoothly execute the molding operation, and increase the operation efficiency.

The operator confirms the shift operation conditions, molding conditions, products and precautions, and starts the molding operation.

In the molding operation, the main control section 31 controls the temperature control section 47, heats the heaters HN and H11–H3, and sets the temperature of the nozzle, front part, middle part and rear part of the barrel 3 to the values suitable for melting synthetic resin material.

For example, the nozzle is set to 310° C., the front part is set to 320° C., the middle part is set 310° C., and rear part is set to 300° C.

In a state where the temperature of the barrel 3 is suitably controlled, the synthetic resin material is input from the hopper 2 to the barrel 3. The input synthetic resin material is heated and molten by the heaters in the barrel 3.

For example, the synthetic resin material input from the hopper 2 to the barrel 3 is heated and molten by the heater H3 in the rear part. As the degree of melting is lower in the rear part, the molten synthetic resin material is a little hard.

The main control section 31 controls the sequence processing section 32 and servo command section 33.

The servo command section 33 outputs a driving signal to the measuring servomotor 17 through the servo amplifier 37, and drives the measuring servomotor 17.

The measuring servomotor 17 operates the injection screw 4, and measures the molten resin to inject.

The servo command section 33 outputs a driving, signal to the injection servomotor 6 through the servo amplifier 35, and drives the injection servomotor 6.

The injection servomotor 6 rotates and advances, the injection screw 4.

The molten resin in the rear part is pushed forward by the advance of the injection screw 4. The resin is heated and molten by the heater H2 in the middle part, and further heated and molten to a state sufficient for injection by the heater H1 in the front part.

The injection screw 4 pushes the molten resin to the injection nozzle heated by the heater HN by the forward end 4a of the screw 4.

The barrel 3 injects the molten resin from the injection nozzle 5 to the nozzle inlet 18a of the metal mold halves 18. The injected molten resin is filled in the cavity 20 of the metal mold halves 18.

After the molten resin is filled in the cavity, the injection molding machine operates the device 19 to open/close and clamp the metal mold halves 18, separate the metal mold halves 18 from the barrel 3, and release the metal mold halves 18.

The molded product is taken out from the metal mold halves 18.

If the injection molding machine is temporarily stopped during the injection molding process, the main control section 31 reads the shift minus temperature or shift absolute temperature stored in the RAM, and controls the temperature control section 47 based on the read temperature.

For example, if the shift absolute temperature is selected, the main control section 31 reads the shift absolute temperature from the RAM, and controls the temperature control section 47 based on the temperature.

The temperature control section 47 changes all temperatures of the rear part, middle part, front part and nozzle of the barrel 3 to the shift absolute temperature.

For example, if the shift absolute temperature is 210° C., all temperatures of the rear part, middle part, front part and nozzle of the barrel 3 are controlled to the same 210° C.

By using this temperature control, the resin is held at 210° C. and prevented from scorching, even when resin which is scorched when left at 220° C. is used.

The temperature of the barrel 3 is not unnecessarily lowered.

Therefore, the injection molding machine can speedily set the temperatures of each part of the barrel 3.to the temperatures suitable for injection when restarting the operation. The characteristics of resin in the barrel 3 is not changed.

If the shift minus temperature is selected, the main control section 31 reads the shift minus temperature from the RAM, and controls the temperature control section 47 based on the temperature.

The temperature control section 47 uniformly lowers the temperatures of the rear part, middle part, front part and nozzle of the barrel 3, to the shift minus temperature.

For example, if the shift minus temperature is −100° C., the temperatures of the rear part, middle part, front part and nozzle of the barrel 3 are controlled to 200° C., 210° C., 220° C., and 210° C., respectively.

Therefore, if resin which is not scorched when left at 220° C. is used, this temperature control is sufficient.

Further, by using this temperature control, the injection molding machine merely increases temperatures of each part of the barrel 3 by 100° C. when restarting the operation, and the control is simple.

As explained above, the injection molding machine can suitably set the temperatures of each part of the barrel 3 according to the synthetic resin used, when the machine is temporarily stopped.

In the above described embodiment, the number of temperature controlled parts of the barrel 3 are four, the rear, middle and front parts and the nozzle. However, the number of temperature controlled parts is not limited to four. The number of temperature controlled parts may be two, three, or more than five.

In this embodiment, the display section having a touch panel is provided separately from the HMI section. However, it must be appreciated that the display section may be provided integrally with the HMI section.

Additional aspects and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. A control device for use in an injection molding machine, the injection molding machine including a barrel having an injection nozzle disposed at a forward end of the barrel, the barrel containing an injection screw rotatably and retractably from the injection nozzle, the barrel having heaters arranged on an outer circumference of the barrel, the heaters being configured to heat and melt synthetic resin material input through a rear part of the barrel, wherein the barrel pushes the molten resin to the forward end by the rotation of the injection screw, and injects the molten resin through the injection nozzle, the control device comprising:

a temperature control section configured to control temperatures of parts of the barrel to predetermined temperature values by controlling the heaters;

a shift minus temperature set memory which sets a shift minus temperature to uniformly lower the control temperatures of the parts;

a shift absolute temperature set memory which sets a shift absolute temperature to lower the control temperatures of the parts to a predetermined temperature; and a selection means which selects the temperatures set in the temperature set memories to lower the temperature of the parts controlled by the temperature control section.

2. The control device of the injection molding machine according claim 1, wherein the temperature control section is configured to control the temperatures of a rear part, a middle part, a front part and nozzle of the barrel to predetermined temperatures.

3. The control device of the injection molding machine according claim 1, further comprising:

a human machine interface section in communication with the temperature control section;

a display section including a touch panel, the touch panel being provided with a display screen for inputting identification information and selection information;

a condition memory which stores molding conditions set for products and identification information of the molding; and an image memory which stores image data of products and identification information of the products;

wherein the human machine interface section is configured to call a corresponding molding condition from the molding conditions stored in the condition memory and display the condition in the display section, when identification information is input through the touch panel of the display section, and to call a corresponding image data from the image memory and display the image data in the display section.

4. The control device of the injection molding machine according claim 1, further comprising:

a human machine interface section in communication with the temperature control section;

a display section including a touch panel, the touch panel being provided with a display screen for inputting identification information and selection information;

a condition memory which stores molding conditions set for products and identification information of the products; and a memo information memory which stores memo information including precautions to be taken on molding under various molding conditions, and identification information, wherein the human machine interface section is configured to call a corresponding molding condition from the molding conditions stored in the condition memory and display the condition in the display section, when identification information is input through the touch panel of the display section, and to call memo information from the memo information memory and display the memo information in the display section.

* * * * *